United States Patent Office 3,452,918
Patented July 1, 1969

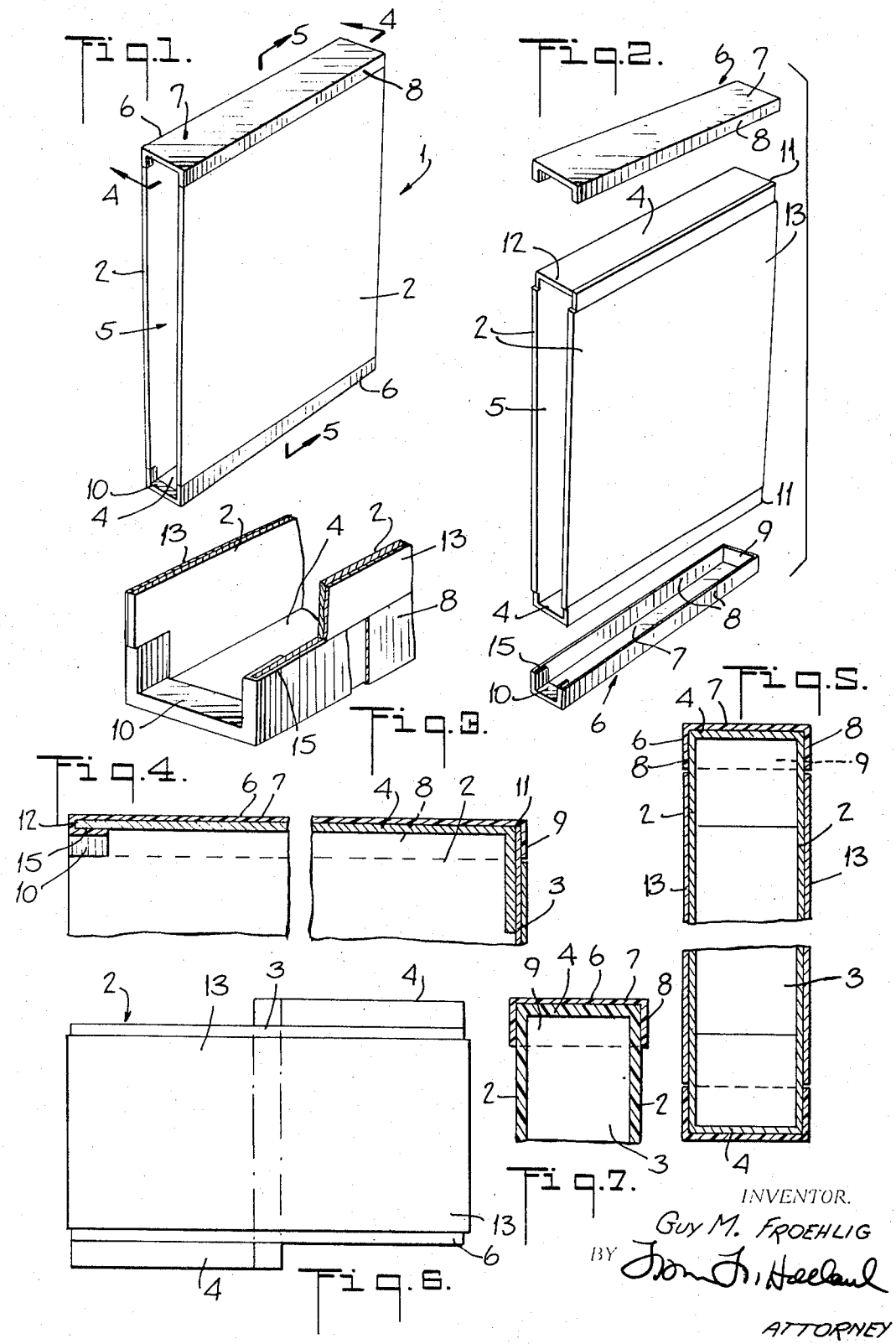

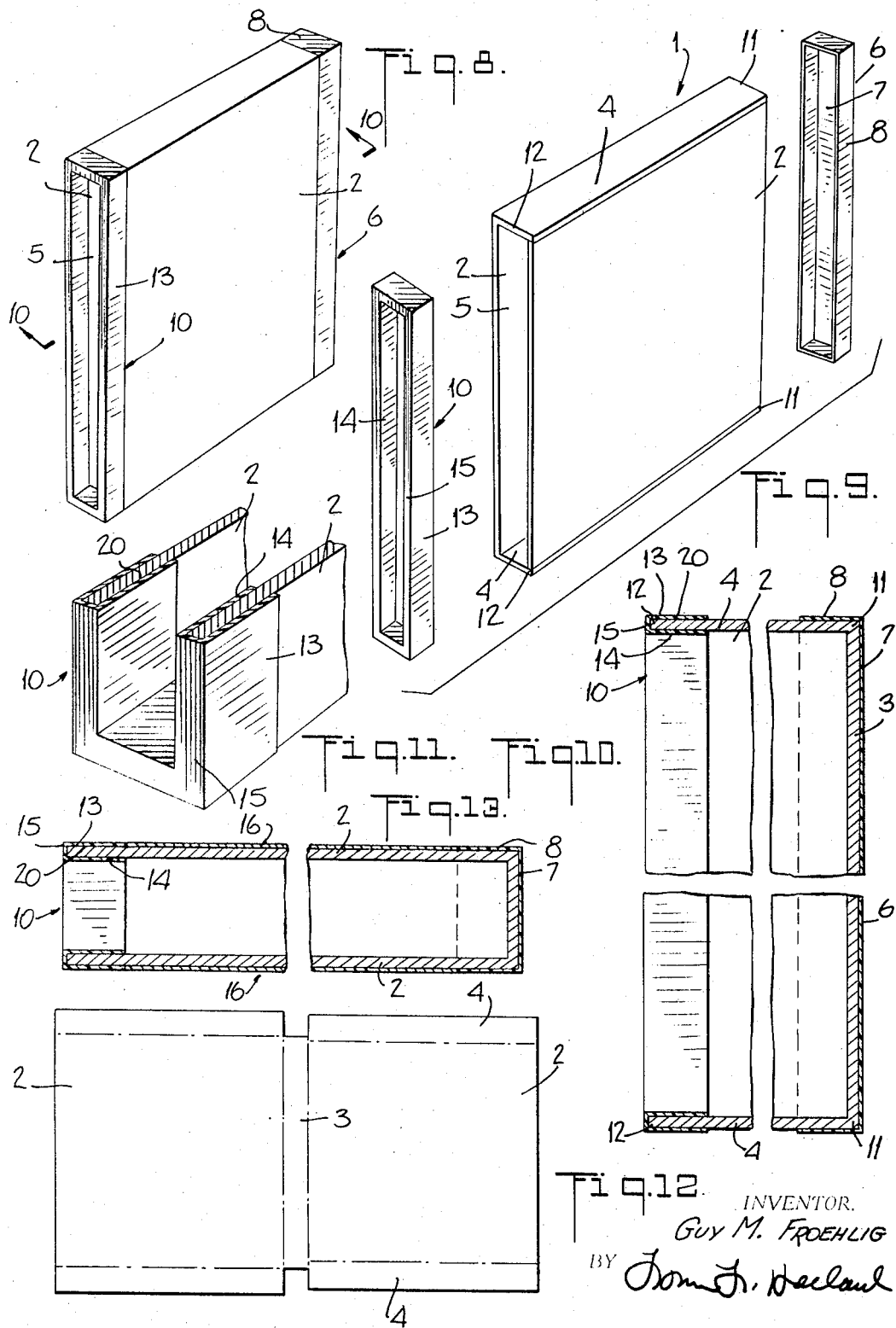

3,452,918
PHONOGRAPH RECORD ALBUM
Guy M. Froehlig, Glen Cove, N.Y., assignor to Modern Album and Finishing Inc., College Point, N.Y., a corporation of New York
Filed Dec. 13, 1967, Ser. No. 690,254
Int. Cl. B65d 5/32, 27/00, 85/30
U.S. Cl. 229—6                    12 Claims

ABSTRACT OF THE DISCLOSURE

The present invention is directed to an improved phonograph record album which is provided with means for reinforcing the front and rear corners of the album to prevent these corners from being damaged by removal and replacement of phonograph records therein.

---

The present invention relates to an improved phonograph record album and more particularly to a phonograph record album which is adapted to receive a plurality of phonograph records.

Heretofore, a number of phonograph record albums have been designed to receive a plurality of phonograph records. Some of these phonograph record albums are provided with a cover portion which is hingedly connected to the body portion and which must be opened in order to remove the phonograph record therefrom.

Other types of phonograph record albums are in the form of boxes which have an open mouth through which the individual phonograph records are removed and inserted. It has been found that such boxes tend to be damaged at the corners adjacent the mouth due to the resulting wear and tear from removal and replacement of phonograph records.

The present invention substantially eliminates this defect and provides an improved phonograph record album in which the edges adjacent the mouth of the album are reinforced to prevent them from being damaged.

Another object of the present invention is the provision of an improved phonograph record album in which both the front and rear edges of the album are reinforced.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

FIG. 1 is a perspective view showing the improved album of the present invention;

FIG. 2 is an exploded view showing the phonograph record album;

FIG. 3 is a perspective detail of one front corner of the album;

FIG. 4 is a sectional view taken along line 4—4 of FIG. 1;

FIG. 5 is a sectional view taken along line 5—5 of FIG. 1;

FIG. 6 is an elevational view showing the blank from which the phonograph record album is formed;

FIG. 7 is a sectional view showing a variation of the embodiment of the album shown in FIGS. 1 through 6;

FIG. 8 is a sectional view of another embodiment of the present invention;

FIG. 9 is a perspective view of the album shown in FIG. 8;

FIG. 10 is a sectional view taken along line 10—10 of FIG. 8;

FIG. 11 is a detailed perspective view showing a front corner of the album;

FIG. 12 is an elevational view showing the blank from which the album of the present invention may be formed; and FIG. 13 is a variation of the album shown in FIGS. 8 through 12.

Referring more particularly to the embodiment shown in FIGS. 1 through 7, the album 1 of the present invention comprises a pair of side panels 2 hingedly connected to a rear end panel 3 and top and bottom end panels 4, each of which are hinged to the side panels 2 as shown in FIG. 6. The finished album has a mouth 5 at its front end.

A pair of reinforcement caps 6 are mounted over the top and bottom panels 4. The reinforcement caps 6 are preferably made of a plastic material which is preferably molded of light gauge material. Each reinforcement cap 6 is provided with a top wall 7 and side and rear depending skirts 8 and 9, respectively. The front end of each reinforcement cap 6 has a reentrant portion 10 parallel to the top wall 7 to form a corner-receiving channel 15.

The reinforcement caps 6 are snapped over the top and bottom end panels 4 of the album so that the rear skirt 9 snaps over the rear corner 11 of the album and the front corner-receiving channel 15 receives and holds the front corner 12. Thus, the front and rear corners 11 and 12 of the album are protected against wear and tear from the normal pressures and forces to which these corners are subjected when the phonograph records are removed and replaced. Hence, a plurality of phonograph records can be placed inside this jacket and during removal or replacement the corners 11 and 12 will not be damaged.

If desired, as seen in FIGS. 1 through 6, the side panels 2 and the rear panel 3 may be provided with a lamination or sheet 13 so that the skirt portions 9 and 8 of the reinforcement 6 will be flush with the lamination 13 of the side panels. Of course, it will be understood that these laminations 13 need not be present, as shown in FIG. 7.

The entire album can thereafter be covered with a finish sheet (not shown) which may have descriptive material thereon, such as artist's name, selections, etc. If desired, the open mouth 5 may be closed with a removable closure cap (not shown).

Referring now to the embodiment shown in FIGS. 8 through 13, the phonograph record album 1 is shown having a pair of side panels 2, a rear panel 3 hinged to each side panel 2 and top and bottom end panels 4 formed by flaps extending from the side panels 2 and adhered together. The finished album has an open front mouth 5.

A rear reinforcement cap 6 is snapped over the rear panel 3 of the album in order to reinforce the upper and lower rear corners 11 thereof. The rear reinforcement cap 6 comprises a top portion 7 and a depending skirt 8.

A front reinforcement cap 10 is snapped over the open mouth 5 of the album to reinforce the upper and lower front corners 12. The front reinforcement cap 10 comprises a U-shaped channel member having a pair of parallel skirt portions 13 and 14 connected together at 15 to form front edge receiving channel 20. The front edges of the mouth 5 of the album enters into the U-shaped front edge receiving channel 20 to protect the upper and lower front corners 12. When phonograph records are removed or replaced from the album, the corners 12 and 11 will thus be protected so that they will not be damaged.

Preferably, the reinforcement caps 6 and 10 are made of a thin molded plastic material.

It will be noted that in the embodiment shown in FIGS. 8 through 12, the side panels 2 are not laminated so that there is a step between the side panels 2 and the front and rear reinforcement elements 10 and 6, respectively. If desired, the step may be eliminated by laminating the panels 2 with sheets 16, as shown in FIG. 13. A finish cover sheet (not shown) can be placed over the entire album. The finish cover sheet may contain descriptive material such as artist's name, composer, selection, etc.

If desired, a removable closure cap (not shown) may be applied over the mouth of the album to prevent the phonograph records from inadvertently slipping out of the album.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A phonograph record album comprising a mouth having front opposed corners, end panels, side panels, a rear panel having opposed rear corners, each front corner comprising the edges of a pair of side panels connected together by the edge of an end panel, reinforcing means on said album for reinforcing said front corners to prevent them from being damaged, said reinforcing means having a corner receiving channel adapted to embrace the edges of said side and end panels and at least the areas immediately adjacent thereto.

2. A phonograph record album as claimed in claim 1, wherein said reinforcing means comprises a reinforcement cap mounted over at least one of said front corners.

3. A phonograph record album as claimed in claim 2, wherein said corner receiving channel comprises a pair of spaced elements connected together by a base.

4. A phonograph record album as claimed in claim 3, wherein said reinforcement cap has integral means adapted to be mounted over at least one of said rear corners of the album to protect it from being damaged.

5. A phonograph record album as claimed in claim 4, wherein said reinforcement cap comprises a top portion and a skirt portion and extends along each end panel of said album and wherein said skirt portion embraces said rear corner.

6. A phonograph record album as claimed in claim 1, wherein said reinforcement cap is adapted to receive the entire edge of the mouth of the album including said front corners.

7. A phonograph record album as claimed in claim 6, wherein a rear reinforcement cap is provided adapted to be mounted over the rear panel of said album, said rear reinforcement cap comprising a cover portion and a depending skirt portion.

8. A phonograph record album as claimed in claim 1, wherein said side panels have laminations thereon which are flush with said reinforcement cap.

9. A reinforcement cap for reinforcing a front corner of a phonograph record album, said reinforcement cap comprising a U-shaped corner-receiving channel, said corner receiving channel comprises a pair of spaced elements connected together by a base and being adapted to embrace a front corner of a phonograph record album.

10. A reinforcement cap as claimed in claim 9, wherein said cap is a front reinforcement cap and comprises a U-shaped element adapted to receive the entire edge of the mouth of the album including the front corners thereof.

11. A reinforcement cap as claimed in claim 9, wherein said reinforcement cap has integral means extending from said corner receiving channel adapted to be mounted over a rear corner of the album to protect it from being damaged.

12. A reinforcement cap as claimed in claim 11, wherein said reinforcement cap comprises a top portion and a skirt portion and extends along each end panel of said album and wherein said skirt portion is adapted to embrace said rear corner.

References Cited

UNITED STATES PATENTS 3,061,086 10/1962 Smiler _____ 206—62
3,292,841 12/1966 Donovan.

FOREIGN PATENTS 1,181,443 11/1964 Germany.

DAVID M. BOCKENEK, *Primary Examiner.*

U.S. Cl. X.R.

206—62; 229—68